No. 662,039. Patented Nov. 20, 1900.
E. W. STULL.
CONTROL OF ELECTRIC MOTORS.
(Application filed June 8, 1900.)
(No Model.) 3 Sheets—Sheet 1.

WITNESSES:
D. W. Powell
B. M. Smith

INVENTOR
E. W. Stull,
BY
Geo. H. Parmelee
his ATTORNEY.

No. 662,039. Patented Nov. 20, 1900.
E. W. STULL.
CONTROL OF ELECTRIC MOTORS.
(Application filed June 8, 1900.)
(No Model.) 3 Sheets—Sheet 3.

WITNESSES:
G. M. Powell
B. M. Smith

INVENTOR
E. W. Stull
BY Geo. H. Parmelee
his ATTORNEY.

THE NORRIS PETERS CO., PHOTO-LITHO., WASHINGTON, D. C.

UNITED STATES PATENT OFFICE.

EMMETT W. STULL, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 662,039, dated November 20, 1900.

Application filed June 8, 1900. Serial No. 19,641. (No model.)

*To all whom it may concern:*

Be it known that I, EMMETT W. STULL, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

This invention has relation to the control of electric motors, and although it may be applied to motors generally is more particularly designed to provide a novel method for the control of four or more electric railway-motors.

The invention is designed to provide for the economical and efficient control of a plurality of motors, effected mainly by the manipulation of the motors and motor elements, and thereby dispensing very largely, if not entirely, with the use of wasteful external resistance and without at any time entirely opening the motor-circuit.

To this end my invention consists in starting the motors all connected in series, which is the position of maximum torque, and then changing them over to parallel, or the position of maximum speed, through certain intermediate steps in which the motors or motor elements are partly in series and partly in parallel, whereby the acceleration is made more gradual.

The invention also consists in the novel steps and combination of steps, all as hereinafter described, and pointed out in the appended claims.

In the further description of my invention reference will be had to the accompanying drawings, forming a part of this specification.

Figure 1:
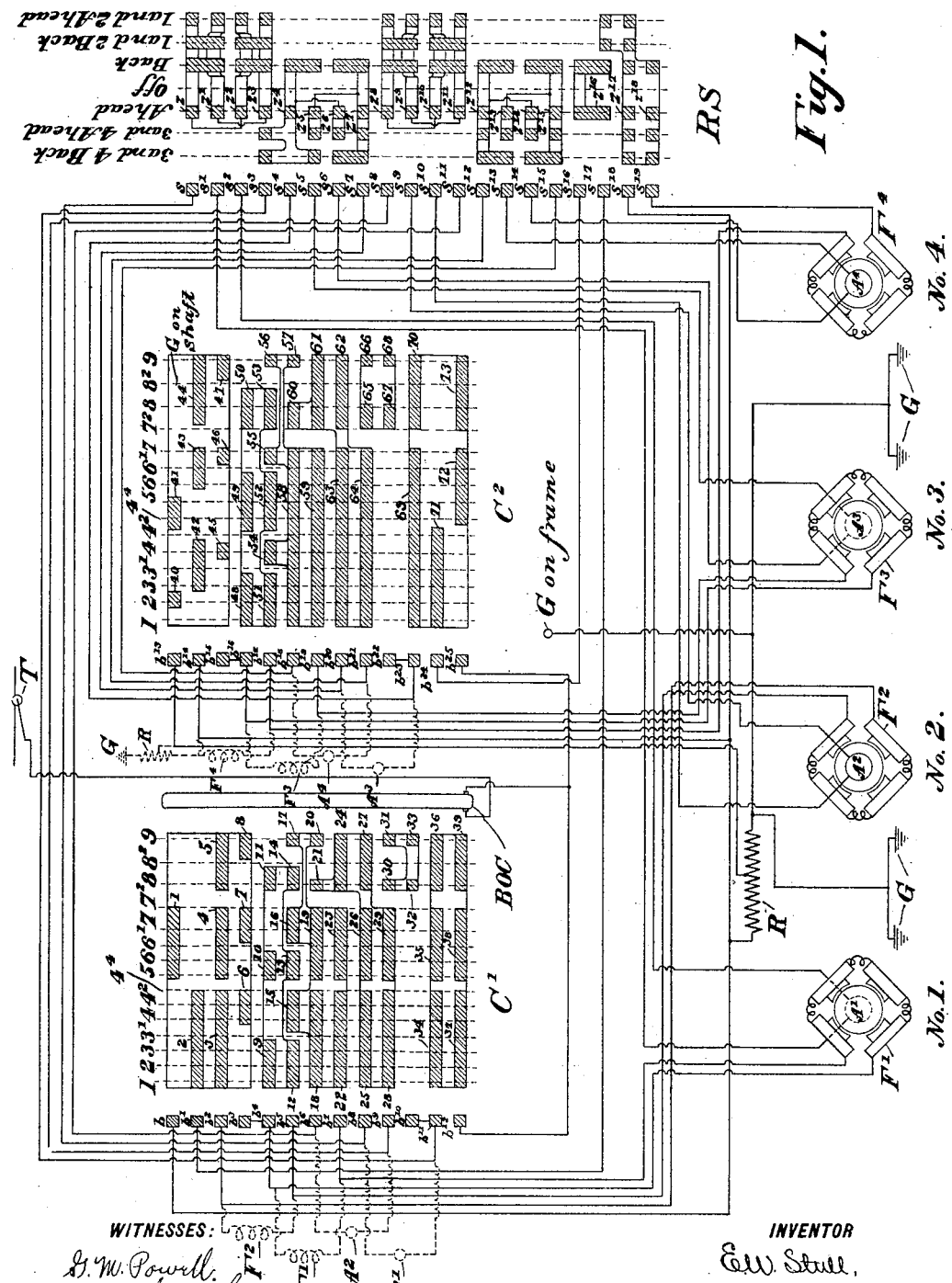
Figure 2A:
Figure 3:
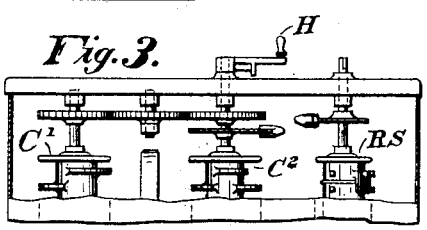

In the drawings, Figure 1 is a planular development or diagram of controlling apparatus suitable for the practice of my invention. Figs. 2 and 2$^a$ are views showing graphically the circuit conditions which are effected in the several positions of the controller, Fig. 2$^a$ being a continuation of Fig. 2; and Fig. 3 is a partial elevation of a controller with the casing broken away.

In Fig. 1, to which reference will first be made, in order to facilitate tracing the circuits at the different positions of the motors I have, in addition to the full diagrammatic representation of the circuits, indicated graphically in dotted lines the connection of the several motor elements between the fixed contacts of the controller.

$A'$ $A^2$ $A^3$ $A^4$ designate, respectively, the armatures of the four electric motors 1 2 3 4, and $F'$ $F^2$ $F^3$ $F^4$ the field-coils of the same.

$C'$ $C^2$ designate the two main moving elements of the controller, and R S the reversing and cut-out switch.

R designates artificial resistance for connection in circuit with the motors under certain conditions.

BOC is a blow-out coil.

G whenever seen indicates a ground connection, and T indicates the trolley or other connection to the high-pressure side of the supply-circuit. The members $C'$ $C^2$ are preferably revolving drums of the well-known type, drum $C'$ having the contacts 1 to 39, inclusive, and drum $C^2$ the contacts 40 to 73, inclusive.

$b$ $b'$ $b^2$, &c., to $b^{12}$ inclusive, designate the fixed contact-fingers which coöperate with the contacts of the drum $C'$, and $b^{13}$ to $b^{25}$, inclusive, indicate the fingers which coöperate with the contacts of drum $C^2$. The reversing-switch also has a plurality of contacts arranged in six vertical lines corresponding to six different positions of the switch indicated, respectively, on the drawings "ahead," "3 and 4 ahead," "3 and 4 back," "back," "1 and 2 back," and "1 and 2 ahead." Between the main ahead and back positions is an open circuit or off position. The only contacts of this switch which it will be necessary to refer to in detail in tracing the circuits hereinafter are those on the main ahead position and designated $z$ $z'$ $z^2$, &c., to $z^{18}$. The fixed coöperating contact-fingers of this switch are designated $s$ $s'$ $s^2$, &c., to $s^{19}$. The relative arrangement, grouping, and connections of the various movable contacts and the circuit connections of the several fixed contacts will be best understood by reference to Fig. 1, on which they are clearly indicated, and detailed description thereof is therefore unnecessary. Attention will, however, be called hereinafter to certain peculiar features in the contact arrangement and the purpose thereof made clear. The two drums or cylinders C' C² are intergeared to revolve in unison by the operation of a single handle H, as shown in Fig. 3. Assuming the fingers of the reversing-switch to stand on the line of contacts marked "ahead" and the drums C' C² to have been moved to position 1, the circuit is as follows: from trolley to blow-out coil BOC to finger $b^{12}$, contacts 37 34, finger $b^{11}$, finger $s^3$, contacts $z^3$ $z'$, armature A', finger $s^2$, contacts $z^2$ $z$, finger $s$, finger $b^8$, contacts 25 28, finger $b^9$, finger $s^8$, contacts $z^8$ $z^{10}$, finger $s^{10}$, armature A², finger $s^9$, contacts $z^9$ $z^{11}$, finger $s^{11}$, finger $b^6$, contacts 18 and 22, finger $b^7$, field F', finger $b^4$, contacts 9 and 12, finger $b^5$, field F², finger $b^2$, contacts 3 and 2, finger $b'$, finger $s^{17}$, contact $z^{16}$, fingers 16, finger $b^{24}$, contacts 71 69, finger $b^{23}$, finger $s^4$, contacts $z^4$ $z^6$, finger $s^6$, armature A³, finger $s^5$, contacts $z^5$ $z^7$, finger $s^7$, finger $b^{20}$, contacts 63 64, finger $b^{21}$, finger $s^{12}$, contacts $z^{12}$ $z^{14}$, finger $s^{14}$, armature A⁴, finger $s^{13}$, contacts $z^{13}$ $z^{15}$, finger $s^{15}$, finger $b^{18}$, contacts 58 59, finger $b^{19}$, field F³, finger $b^{16}$, contacts 48 and 51, finger $b^{17}$, field F⁴, finger $s^{19}$, contacts $z^{18}$ $z^{17}$, finger $s^{18}$, to and through resistance R to ground. The four motors are therefore all connected in series with each other and with resistance. Each drum C' C², it will be seen, controls through the reversing-switch the connections of two of the motors, and the two drums are at this time connected in series through the said switch. In position 2 the only change made is due to the engagement of finger $b^{13}$ with grounded contact 40, which short-circuits a portion of the resistance R. In position 3 the engagement of the finger $b^{14}$ with the contact 42 short-circuits the entire resistance and leaves the motors in plain series. In passing from position 3 to position 4 there are two momentary positions, indicated at 3' and 3². (See Fig. 2.) In the position 3' the overlapping engagement of the finger $b^5$ with the contact 15 short-circuits field F', and the finger $b^{17}$ by overlapping contacts 51 and 54 effects a similar short circuit of the field F³. In the position 3² fingers $b^4$ and $b^{16}$ lose engagement, respectively, with the contacts 9 and 48 and cut out the fields F' F³. In position No. 4 fingers $b^3$ and $b^{15}$, respectively, engage the contacts 6 and 45, thus reconnecting in the fields F' F³. These fields, however, are now respectively in parallel with the fields F² and F⁴, since on each drum the current after passing through the armatures will divide between the fingers $b^7$ and $b^5$ or the fingers $b^{19}$ and $b^{17}$, the two branches after passing through the parallel fields reuniting in the upper group of contacts on each drum, as will be readily seen from Fig. 1, without again tracing the circuit in detail. At the time this position is reached the motors will have developed sufficient counter electromotive force to stand with safety the increased current due to the multiplying of the fields and a corresponding increase in speed will result. Between positions 4 and 5 there are several intermediate positions which occur preparatory to connecting the motors in multiple-series pairs. In position 4' the only change made is the breaking of the circuit through the field F³, by reason of the fact that the finger $b^{15}$ loses its engagement with the contact 45. In position 4² this field is reconnected in circuit, but in series with the field F⁴, by reason of the fact that fingers $b^{16}$ and $b^{17}$ are lapping over into engagement with the contacts 49 and 52. Said field F³ is, however, short-circuited, as the finger $b^{17}$ has not yet lost its engagement with the contact 54. In position 4³ the disengagement of finger $b^{17}$ with the contact 54 removes this short circuit around the field F³ and at the same time the disengagement of the finger $b^{14}$ from the contact 42, and the engagement of the finger $b^{13}$ with the contact 40 puts a portion of the resistance R back in circuit. In position 4⁴ the engagement of the finger 25 (which has heretofore been idle) with the contact 72 short-circuits the drum C' and the two motors connected thereto, and at position 4⁵, which occurs momentarily thereafter, circuit is opened entirely on the drum C'. It was in anticipation of this removal from circuit and the subsequent connection in parallel with the other two motors that a portion of the resistance was put back into circuit at the position 4³, since otherwise a too-sudden jump in speed might occur. I do not, however, consider such use of resistance to be an absolute requisite at this time. In position 5 motors 1 and 2 are again put in circuit by the engagement of the fingers $b$ to $b^{12}$ with the contacts on the vertical line 5. The current after passing through the blow-out coil now divides, one branch of the circuit being as follows: finger $b^{12}$, contacts 38 35, finger $b^{11}$, to and through armature A' back to finger $b^8$, to contacts 26 29, finger $b^9$, armature A², finger $b^6$, contacts 19 and 23, finger $b^7$, field F', finger $b^4$, contacts 10 and 13, finger $b^5$, field F², finger $b^2$, contacts 4 and 1, finger $b$, to resistance R, through a portion of the latter, to finger $b^{13}$, to contact 41, to ground. The other branch of the circuit is to finger $b^{25}$, contacts 72 69, finger $b^{23}$, armature A³, finger $b^{20}$, contacts 63 64, finger $b^{21}$, armature A⁴, finger $b^{18}$, contacts 58 59, finger $b^{19}$, field F³, finger $b^{16}$, contacts 49 52, finger $b^{17}$, field F⁴, and through a portion of resistance to ground by the same path as the first-described branch. It will of course be understood that a part of each branch circuit is through the reversing and cut-out switch; but it was not thought necessary to again trace out in detail the connections through the switch. In position 6 the only change made is to remove that portion of the resistance which was before in circuit, this being effected by the engagement of the finger $b^{14}$ with the grounded contact 43. In position 6' fields F' and F³ are respectively short-circuited by the finger $b^4$ lapping onto the contact 16 and the finger $b^{17}$ lapping onto the contact 55. At position 6² the fields F' F³ are removed from circuit by the brushes $b^4$ $b^{16}$, leaving the contacts 10 and 49, respectively. At position 7 the engagement of the brushes $b^3$ and $b^{15}$, respectively, with the contacts 7 and 46, reconnects in the fields $F'$ $F^3$ in multiple, respectively, with the fields $F^2$ $F^4$. At position $7'$ none of the fingers $b^{13}$ to $b^{25}$ are in engagement, the circuit to the motors 3 and 4 being opened. At position $7^2$ motors 3 and 4 are again connected in circuit, with their armatures in multiple and their fields in series. The multiple connection of the armatures is effected by the fingers $b^{21}$, $b^{22}$, and $b^{23}$ engaging the contacts 70, 67, and 65, return connections being to fingers $b^{20}$ and $b^{18}$. The two branches of the circuit then unite and the current passes from contact 61 to finger $b^{19}$, to field $F^3$, to finger $b^{16}$, to contacts 50 53, to finger $b^{17}$, to field $F^4$, to ground through finger $b^{14}$ and grounded contact 44. At position $7^3$ the circuit is again opened on the drum $C'$ without disturbing the circuit of motors 3 and 4. At position 8 circuit is again closed on the drum $C'$ and the motors 1 and 2 are again connected in parallel with the motors 3 and 4, but with their armatures in parallel with each other and their fields in series. The circuit through the motors 1 and 2 can be readily followed in Fig. 1 without being traced in detail, the connections corresponding substantially with those just traced on the drum $C^2$. At position $8'$ armatures $A^2$ and $A^4$ are cut out by reason of the fact that the fingers $b^9$ and $b^{10}$ lose engagement with the contacts 30 and 32, and the fingers $b^{21}$ $b^{22}$ leave the contacts 65 and 67. Position $8^2$ leaves these armatures still cut out and also short-circuits their respective fields $F^2$ and $F^4$ by reason of the fact that the fingers $b^3$ and $b^{15}$ are lapping over, respectively, onto the contacts 8 and 47. At position $8^3$ fingers $b^5$ and $b^{17}$ lose engagement with the respective contacts 14 and 53, and thus cut out the said fields. At position 9, which is the final position, motors 2 and 4 are reconnected in circuit entirely in multiple with each other, and the four motors are also in full multiple with each other. It will be readily seen without tracing the circuits in detail that the engagement of the fingers $b^9$, $b^{10}$, and $b^{11}$ with the contacts 31, 33, and 36 effects the multiple connection of armatures $A'$ and $A^2$, while the similar engagement of the fingers $b^{22}$, $b^{23}$, and $b^{24}$ with the contacts 66, 68, and 70 effect the multiple connection of the armatures $A^3$ $A^4$; also, that the engagement of fingers $b^5$, $b^6$, $b^7$, and $b^8$ with the contacts 17, 20, 24, and 27 effect the paralleling of the fields $F'$ $F^2$, and the engagement of the fingers $b^{17}$, $b^{18}$, $b^{19}$, and $b^{20}$ with the contacts 56, 57, 61, and 62 effect the paralleling of the fields $F^3$ and $F^4$. Inasmuch as in my method of control the motors are started all in series, it will be readily seen that their combined ohmic resistance is sufficiently great to prevent a very large inrush of current, so that comparatively little external resistance is required, or I may entirely omit the use of such resistance. There is therefore comparatively little useless expenditure of current. At the same time I gain the advantage at starting of a maximum torque. After position 3 is reached the next notch or running position is position 4, in which the paralleling of the fields effects a considerable acceleration in speed. All the intermediate positions between 4 and 5 are transitory positions, which are effected in rapid succession. Positions 5 and 6 are running positions and of course effect a further considerable acceleration in speed. The next running position is position 7. Positions $7'$, $7^2$, and $7^3$ are transitory positions, as are also positions $8'$, $8^2$, and $8^3$. Positions 7 and 8, it will be seen, afford a gradually accelerating transition from position 6 to position 9, which is that of maximum speed.

For want of space not all the transitory positions are indicated in Fig. 1. These positions, moreover, while they are well adapted to the running positions to which they are preparatory, are not essential, since other preparatory circuit conditions might be employed.

Other minor steps or positions I have herein shown and described are not essential to my invention as pointed out in the claims, nor do I wish to limit myself to the use of the particular apparatus herein described and which forms the subject-matter of a divisional application filed July 25, 1900, Serial No. 24,771, since other forms or types of controllers may be used to carry my novel method into effect.

Having thus described my invention, what I claim, and desire to secure by Letters Patent, is—

1. The method of controlling a plurality of electric motors, which consists in starting them connected all in series with each other, then connecting them in parallel groups whose individual motors are connected in series, and then connecting all the motors in parallel certain of the motor elements being connected in parallel in passing from the position of full series to the position of parallel groups and also in passing from the position of parallel groups to full parallel position.

2. The method of controlling a plurality of electric motors, which consists in starting them connected all in series with each other, then connecting certain elements of the motors in parallel with each other but in series with the remaining elements, then connecting the motors in parallel groups whose individual motors are connected in series with each other, then connecting all the motors in parallel.

3. The method of controlling a plurality of electric motors, which consists in starting them connected all in series, then connecting them in series groups with the fields of each group connected in parallel, then connecting the groups in parallel with the individual motors of each group in series, and then connecting all the motors in parallel.

4. The method of controlling a plurality of electric motors in groups which consists in starting them connected all in series, and while still in series connecting the fields of each group in parallel with each other, then connecting the groups in parallel with their individual motors in series, then connecting in multiple in each group certain of the motor elements with the remaining elements in series, and then connecting all the motors in multiple.

5. The method of controlling a plurality of electric motors in groups which consists in starting them connected all in series, and while still in series connecting one element of each motor of each group in parallel with the like element of the other motor or motors of the group, then connecting the groups in parallel with their individual motors in series, then connecting first one element of each motor in each group in parallel with the like element of the other motor or motors of the group, and the remaining elements in series, then changing the connections so that the before series-connected elements are in parallel and the before parallel-connected elements are in multiple, and finally connecting all the motors in multiple.

6. The method of controlling a plurality of electric motors in groups, which consists in starting them all in series, then connecting the fields of each group in parallel, then connecting the groups in parallel with their individual motors in series, then first connecting the fields of each group in parallel with the armatures in series, and afterward the armatures in parallel and the fields in series, and finally connecting all the motors in series.

7. The method of controlling a plurality of electric motors in groups, which consists in starting them all in series, then connecting the fields of each group in parallel, then connecting the groups in parallel with their individual motors in series, then first connecting the fields of each group in parallel with the armatures in series, and afterward the armatures in parallel and the fields in series, and finally connecting all the motors in multiple, the parallel connection of the armatures alone being effected successively in the different groups.

8. The method of controlling a plurality of electric motors, which consists in starting them all connected in series, then connecting them in parallel groups whose individual motors are connected in series, and then connecting all the motors in multiple, and preparatory to each of the last two steps first coupling certain elements of the motors of each group in parallel.

9. The method of controlling a plurality of electric motors, which consists in starting them all connected in series, then removing from circuit the field-coils of part of the motors and reconnecting them in circuit in parallel with the other field-coils and in series with the armatures, then opening the circuit through one group of motors and connecting them in parallel with the other motors, but with the motors of each group in series, then again removing and reconnecting in parallel the fields of each group, then successively opening the circuit of each group and reconnecting it in circuit with its armatures in parallel and its fields in series, and then removing one motor of each group and reconnecting all the motors in parallel.

10. The method of controlling a plurality of electric motors, which consists in starting them connected all in series with each other and also with external resistance, gradually removing the resistance and then connecting the fields only of each pair of motors in parallel, then again inserting external resistance and connecting the pairs of motors in parallel with their individual motors in series, then removing such resistance and again connecting the fields of each pair in parallel, then restoring the series connections of the fields and connecting the armatures of each pair in parallel, and finally connecting all the motors in parallel.

In testimony whereof I have affixed my signature in presence of two witnesses.

EMMETT W. STULL.

Witnesses:
BLANCHE M. SMITH,
H. W. SMITH.